United States Patent

[11] 3,581,865

| [72] | Inventor | Gordon C. Adams<br>Auburn, Mass. |
|---|---|---|
| [21] | Appl. No | 32,810 |
| [22] | Filed | Apr. 29, 1970 |
| [45] | Patented | June 1, 1971 |
| [73] | Assignee | Diamond Machinery Company<br>Lewiston, Maine |

[54] INCLINED TRANSFER STATION
8 Claims, 4 Drawing Figs.

| [52] | U.S. Cl. | 198/19 |
|---|---|---|
| [51] | Int. Cl. | B23q 5/22 |
| [50] | Field of Search | 198/19, 28, 185, 43, 182; 209/125 |

[56] References Cited
UNITED STATES PATENTS
3,276,563 10/1966 Fitzgerald.................. 198/28

*Primary Examiner*—Edward A. Sroka
*Attorney*—David H. Semmes

ABSTRACT: Worktables, particularly an inclined transfer station positioned adjacent a top endless conveyor for diverting tote boxes from the conveyor to a work station area and then returning the boxes via a lower conveyor. The inclined transfer station includes a receiving platform which is parallel to the conveyor and has a stop roller at its bottom edge in between the top and lower conveyors. The stop roller is mounted upon an axis transverse to the conveyors. The receiving platform may include a guard rail on its outer side. The assembly saves work station space and operator time in receiving and returning tote boxes to the conveyors.

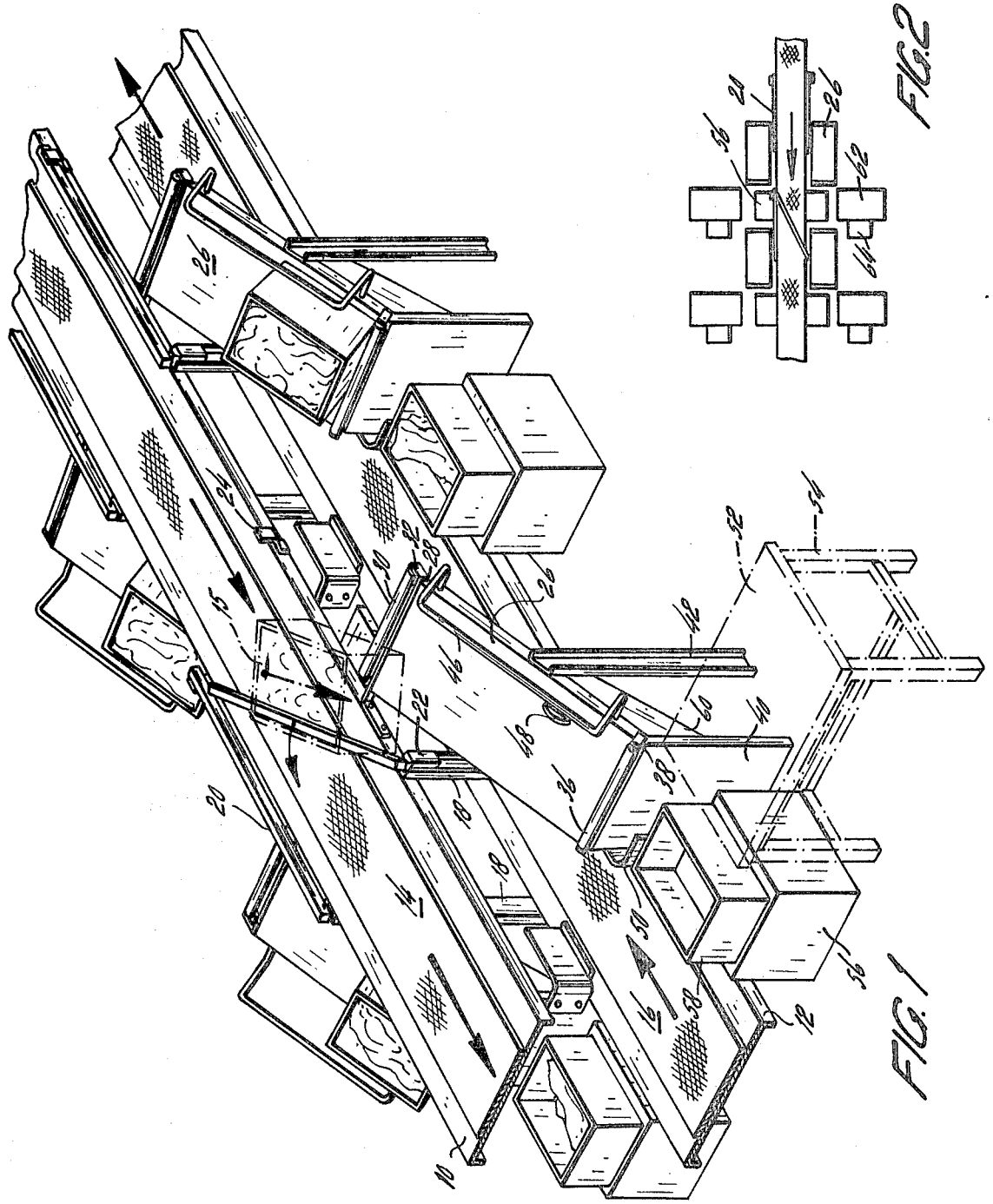

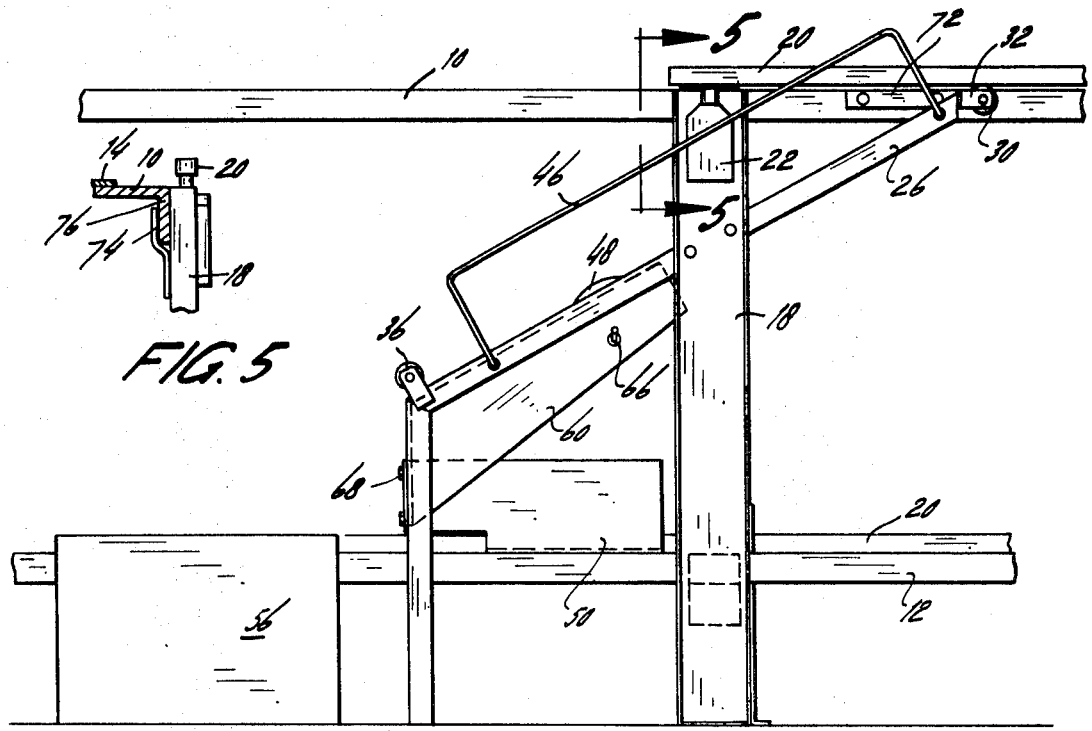
FIG. 5
FIG. 3
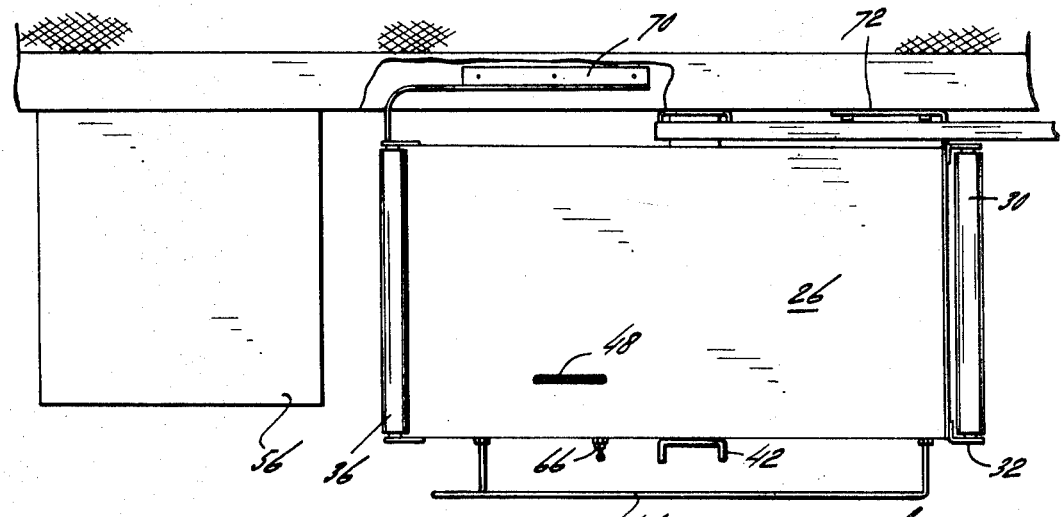
FIG. 4
INVENTOR
GORDON C. ADAMS
BY David H. Lemmer
ATTORNEY

INCLINED TRANSFER STATION

BACKGROUND OF THE INVENTION

1. Field of the Invention

In the shoe and clothing industries, a principal problem resides in the endless conveyor delivery of workpiece boxes to work stations, manned by sewing machine or like operators. Conventionally, a rotary arm is used to deflect the workpiece box from the conveyor onto a receiving platform. The operator is required to lift the box from the receiving platform into her work area and, after completion of her work, to stand and walk the work box from her work area back onto the conveyor. The space required for such work area stations is considerable and expensive. The operator fatigue engendered by lifting, walking, and moving is also expensive.

2. Description of the Prior Art

The prior-art receiving platform devices include solenoid-activated diverter arms, as illustrated and described in Fitzgerald U.S. Pat. No. 3,276,563, diverting a workpiece box from an endless conveyor onto an inclined receiving platform. Conventionally, the workpiece box is required to be carried manually and reset upon the conveyor. The receiving platform and the area of returning the workpiece box are separated longitudinally along the conveyor with consequent loss in work area space and additional expense.

Earlier inventors in dealing with one or more superposed conveyors have employed dropleaf arms for diverting a bakery pan from one conveyor to another. See, for example, Bird U.S. Pat. No. 1,321,784, FIG. 3 hinged platform 36 for diverting loads of bread from top conveyor to 9 to bottom conveyor 28 and Rasmussen U.S. Pat. No. 1,414,667 wherein a pair of pivoted arms 49 is used for diverting bread pans from the top conveyor to the bottom conveyor. Also see Sturtze U.S. Pat. No. 1,352,996 showing an adjustable dropleaf or ramp used in the piling of hay.

Rasmussen and Bird show a dropleaf concept in connection with two endless conveyors. The mechanism is relatively complex, the dropleaf serving as both the receiving platform and the return pan. Also, the drop leaf is necessarily positioned at the ends of the endless conveyors. Thus, only two dropleafs could be used with each conveyor.

The present table is adapted to be positioned in any location along the sides of endless conveyors, facilitating its portability and adaptability to various types of work room situations. Also, the positioning of the inclined platform parallel to the conveyors is a critical space-saving factor. The roller at the lower edge of the platform enables transfer of the tote box to the work station area without lifting by the operator and return by dropping the tote box into the plane of the lower conveyor. The portability of the roll-leaf table enables its ready setup and removal, unlike the prior-art dropleaf mechanisms.

SUMMARY OF THE INVENTION

According to the present invention, an inclined transfer station is positioned parallelly with respect to superposed top and bottom conveyors. The top edge of the receiving platform is mounted in the same plane as the top conveyor, and the bottom edge is mounted intermediate the conveyors and in a plane transverse to the longitudinal axis of the conveyors. The stop roller acts as a stop for articles diverted onto the platform by means of a rotary actuator arm which is pivoted across the conveyor. A guard rail is employed on the outer edge of the platform to guide the packages from the top edge to the bottom edge. The operator simply rolls the received tote box over the stop roller and onto her worktable without lifting. As her work is completed, she drops the tote box onto a lower return platform which guides the tote box onto the bottom or return conveyor.

DESCRIPTION OF THE DRAWINGS

FIG. 1 is a fragmentary perspective showing four inclined platforms mounted adjacent superposed top and bottom conveyors with a tote box being delivered onto the receiving platform in the near foreground;

FIG. 2 is a schematic view of such an assembly;

FIG. 3 is a fragmentary side elevation of the inclined transfer station; and

FIG. 4 is a top plan thereof;

FIG. 5 is a section along 5-5 in FIG. 3.

DESCRIPTION OF THE PREFERRED EMBODIMENTS

Top conveyor support 10 and bottom conveyor support 12 are shown as mounted upon a plurality of stanchions 18 by means of stanchion brackets 74, engaging the downwardly extending edges 76 of the supports.

Top or delivery conveyor 14 delivers tote boxes 15 onto inclined receiving platforms 26 by means of rotary actuator arm 20 pivoted as at 22, so as to extend across conveyor 24. When in rest position, the free end of actuated arm 20 abuts bracket 24 at the sides of support 10.

The inclined platform 26 may be mounted upon stanchions 42 and 18 as well as vertical baffle 40, so that its top edge 28 is supported in the same plane as conveyor 14. A top bracket 72 may be used to rigidize the assembly with respect to the support 10. A top roller 30 is supported by brackets 32 in the conveyor plane, so as to receive the tote box 50, as illustrated. An adjustable guard rail 46 may be positioned on the outer edge of platform 26, which may include rigidizing gusset 60 on its underside. Bottom roller 36 is mounted in an axis transverse to the conveyors and above the inclined surface of platform 26 by means of brackets 38. An operator "on duty/off duty" switch 60 may be used by the work station operator to signal Central Control. A conventional microswitch 48 may be employed, so that, as the tote box is positioned upon the platform, the rotary arm 20 will be prevented from diverting additional tote boxes thereon.

The entire platform assembly may be mounted upon table 52 having legs 54 or may stand independently. A return platform 56 is mounted, so as to abut vertical surface 40, serving as a return for tote box 15 onto bottom conveyor 16. A curvate baffle 50 may be secured to the vertical wall 40 by means of stove bolt 68 or the like, so as to assist in return of the tote boxes onto the moving bottom conveyor.

Since the receiving platform is mounted parallelly to the longitudinal axis of the conveyors, there is a consequent saving in space.

Manifestly, the height of the lower edge 34 may be adjusted such that it is level with the operator's worktable 62. This eliminates the necessity for lifting of the tote box from the inclined platform to the work station area. Since the return area 56 is beneath the lower edge 34, the operator simply drops the tote box onto the lower edge, pushes the box into the moving return conveyor 58.

This transfer station assembly eliminates lifting of the tote box which is delivered at the working level of the girl. It is estimated that 40 percent of the conventional lifting of the 50-—55 pound tote boxes is eliminated. The working area is reduced and it is estimated that 5 to 8 seconds are eliminated per tote box handled. Assuming that a single operator can handle 20 tote boxes a day, a saving of 5 seconds per box would amount to 100 seconds per operator. In a 60-girl system, this would be a saving of 600 seconds per day or 10 hours. The labor savings are manifest.

Manifestly, the platform structure can be varied without departing from the spirit of the invention, as claimed.

I claim:

1. A transfer station for use with at least one endless conveyor comprising:
   A. an inclined receiving platform supported adjacent said conveyor and having:
      i. a top edge in the same plane as said conveyor; and
      ii. a bottom edge in a plane beneath said conveyor; and
   B. a bottom roller transversely supported upon said lower edge in an axis transverse to said conveyor and above the surface of said platform, so as to serve both as a stop for articles received upon said platform and a revolving bearing for removal of conveyed articles from said platform.

2. A transfer station as in claim 1, including a guard rail mounted upon the side of said platform away from said conveyor, as an aid in directing received packages downwardly toward said roller.

3. A transfer station as in claim 2, including:
C. a top roller supported adjacent the top edge of said platform in the same plane as said conveyor, as a rolling bearing assisting in receipt of articles upon said platform.

4. A transfer station for use with at least one endless conveyor, comprising:
A. an inclined receiving platform supported in parallel with said conveyor and having:
   i. a top edge in the same plane as said conveyor;
   ii. a bottom edge in a plane beneath said conveyor;
B. a receiving actuator arm pivoted upon a vertical axis on the side of said conveyor opposite said receiving platform, so as to be pivotable across said conveyor towards said platform and thereby divert articles being carried upon said conveyor onto said platform;
C. a roller transversely supported upon said bottom edge of said platform upon an axis transverse to said conveyor and above the inclined surface of said platform, as a stop for conveyed articles and a roller bearing for removing said articles from said platform; and
D. a guard rail positioned upon the outer edge of said inclined platform as a baffle for packages received thereon.

5. A transfer station as in claim 4, including:
E. a return platform supported adjacent a top endless conveyor and a bottom endless conveyor intermediate the bottom edge of said receiving platform and said bottom conveyor, the top edge of said receiving platform being in the same plane as said conveyor.

6. A transfer station as in claim 5, including a vertical baffle extending from the support structure and return platform to said conveyor, as a guide for returning packages to said lower conveyor.

7. A transfer station as in claim 6, the bottom edge of said receiving platform being in the same plane as an operator work station.

8. A transfer station as in claim 7, the bottom edge of said receiving platform being supported upon a vertically extending baffle abutting the return platform and serving as a guide for return of articles to said lower conveyor.